Dec. 10, 1946.    R. Y. MOSS    2,412,413
GAUGING DEVICE
Filed Aug. 2, 1945
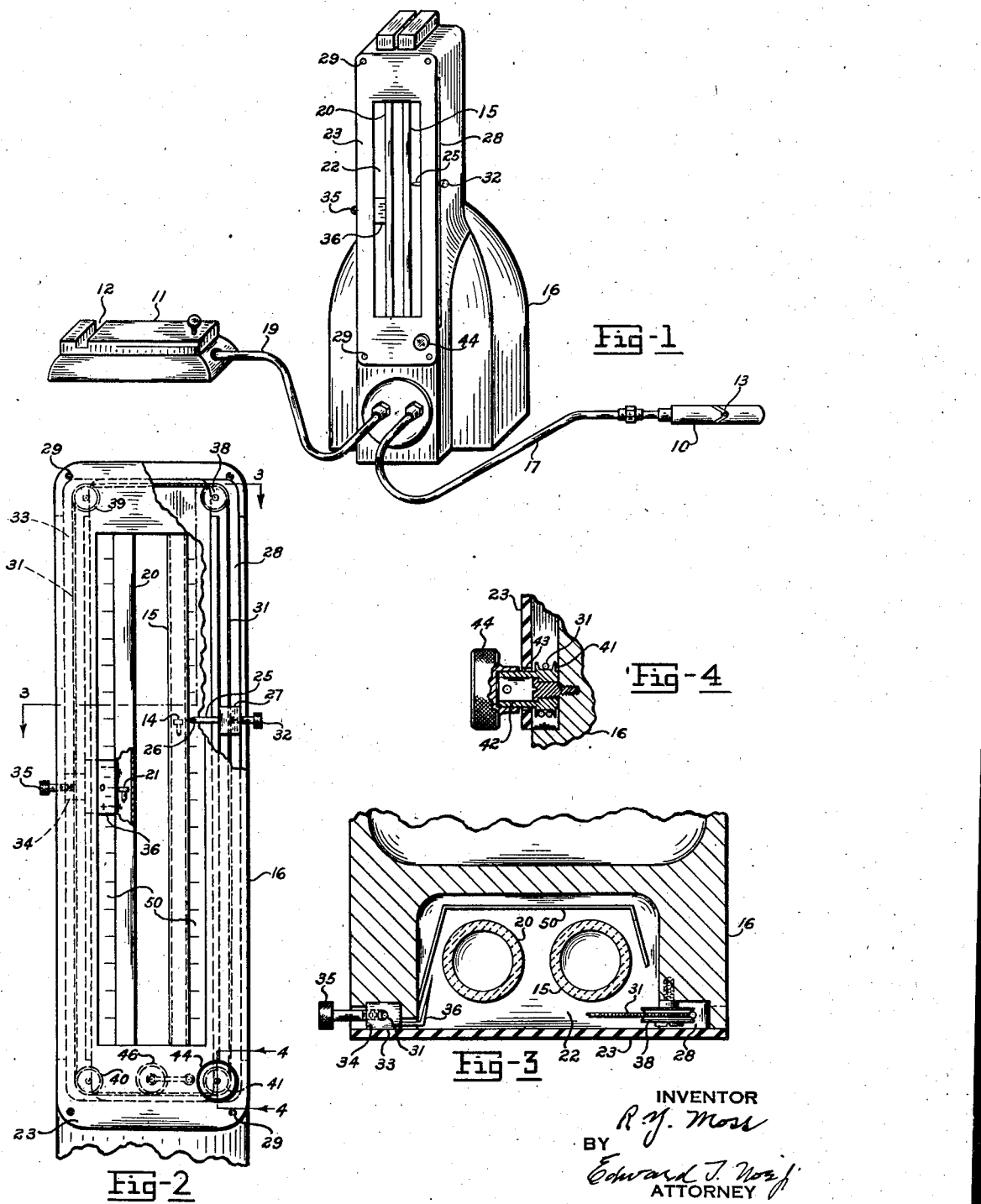
INVENTOR
R. Y. Moss
BY
Edward J. Noe
ATTORNEY Patented Dec. 10, 1946

2,412,413

UNITED STATES PATENT OFFICE 2,412,413

GAUGING DEVICE

Richard Y. Moss, Dayton, Ohio, assignor to The Sheffield Corporation, Dayton, Ohio, a corporation of Ohio Application August 2, 1945, Serial No. 608,477

5 Claims. (Cl. 33—174)

This invention relates to gauging devices and more particularly to gauging devices that measure or compare the size of workpieces by gauging the flow of fluid through leakage orifices.

One object of the invention is the provision of a gauging device embodying a pair of upright tapered flow tubes having floats responsive to the air flow through the tubes and each connected to a gauging member which is adapted for cooperation with male and female parts intended to interfit with one another, adjustable index members being provided for the two tubes and so arranged that as one of these members moves in one direction the other member moves correspondingly in an opposite direction.

Another object is the provision of a gauging device having a pair of flow tubes with indicating means responsive to the rate of flow of fluid through gauging nozzles provided in members intended for cooperation with interfitting male and female parts to be checked or gauged, interconnected index members being arranged for movement in opposite directions whereby the movement of one index member to a point adjacent the indicating means of one tube will automatically adjust a scale member or index for the other tube for direct reading of the clearance between the male and female parts being gauged.

Other objects and advantages of this invention will be apparent from the following description, the appended claims and the accompanying drawing, in which, Fig. 1 is a perspective view of a gauging device embodying the present invention;

Fig. 2 is a front elevation on an enlarged scale showing the indicating and flow tube portions of the gauging device;

Fig. 3 is a horizontal section of the line 3—3 of Fig. 2; and

Fig. 4 is a vertical section of line 4—4 of Fig. 2.

Referring more particularly to the drawing, the invention as herein illustrated is incorporated in a gauging device for directly comparing or measuring the clearance between male and female workpieces intended to cooperate with one another in interfitting relation, these two workpieces being gauged simultaneously by separate work engaging members and similar flow tubes of the character more fully disclosed in the prior patent of Willis Fay Aller, #2,254,259, granted September 2, 1941. In accordance with the present invention, pistons can be successively applied to the gauging device and at the same time the cylinder in which any piston is intended to cooperate can be applied to another portion of the gauging device and the amount of clearance that piston would have in that cylinder can be observed. Thus, the gauging device includes a work engaging spindle 10, see Fig. 1, adapted to enter the hole of the cylinder or other workpiece to be gauged, and a gauging member 11 having a groove or opening 12 to receive the piston or other male part intended to interfit the cylinder. The spindle 10 has a leakage orifice or gauging nozzle 13 that cooperates with the inner surface of the workpiece or cylinder so that the clearance between the outer surface of this gauging nozzle and the workpiece determines the amount of leakage of fluid supplied to the nozzle. The rate of fluid flow is shown by float 14 operable in a flow tube 15 carried by the housing 16 of the gauging device. A flexible conduit 17 connects the gauging spindle 10 to the upper end of the flow tube 15. Air is supplied to the gauging instrument from the factory air line and its pressure is automatically held constant at any desired value by a suitable pressure regulator which supplies the air under pressure to the lower end of the flow tube 15. The internal passage through the flow tube tapers upwardly and gradually so that as the float is carried upwardly by the flowing air, the distance between the float and the walls of the tube increases. The float thus assumes some position of equilibrium depending upon the amount of flow taking place through the gauging nozzle.

The gauging member 11 is also provided with a gauging orifice at one side of the slot or opening, cooperating with the outer surface of the workpiece or piston that might be arranged in that slot and facing towards the workpiece axis. A flexible fluid conduit 19 places the gauging orifice in communication with the upper end of a second flow tube 20, which is arranged adjacent to or alongside of the tube 15. The tube 20 is similar to the tube 15 and is provided with a float 21 responsive to the rate of flow of fluid through that tube. The housing 16 is provided with suitable supporting means for the tubes, which are visible through an opening 22 in a front cover plate 23.

An index arm 25 is adjustably mounted for movement along the tube 15. It has an index mark or line 26 that can be placed opposite the top of the float 14 wherever that float might be when the spindle 10 is entered in the cylinder to be gauged. This index arm is provided on a block 27 which is guided for movement along the groove 28 in the housing 16. The front cover plate 23, which is secured to the housing by suitable screws 29, holds the block 27 in the groove. The block 27 has a passage parallel to the length of the tube, receiving a flexible cable 31. A thumb screw 32 threaded in the block 27 serves as a clamp to secure the cable and the block together, the thumb screw projecting through the clearance space between the cover plate 23 and the housing 16 so it may be conveniently operated from the exterior of the housing whenever it is necessary to adjust the relative position of the block and the cable.

At the opposite side of the housing there is another groove 33 guiding another block 34 having a thumb screw 35 which connects the block to the flexible cable 31. This block is also provided with an index member 36. The arrangement of the block, the cable and the grooves are similar for the two index members, but the index members themselves are different as will be described.

The cable 31 extends upwardly from block 27 and is guided around guide pulleys 38 and 39. It then extends down through the block 34 and around guide pulley 40, then over to an operating drum 41. It may have two turns around this drum so that as the drum is turned the endless cable will be moved equally, moving the two index members and the two blocks, but in opposite directions. The drum 41 is connected to a shaft 42 that extends through an opening 43 in the cover plate 23 as shown in Fig. 4. A hand knob 44 is pinned to this shaft 42 so that the drum can be turned by means of the knob 44.

The grooves in the guide pulleys 38, 39 and 40 are preferably V-shaped and so arranged that they contact the cable along their inclined side. The cable is preferably held taut by a weighted roller 46 pivotally mounted in the housing at one side of the roller axis. The roller bears downwardly on the cable between the pulley 40 and the drum 41.

The index member 36 that is carried by block 34 is in the form of a scale plate having scale readings above and below the zero mark. The readings on this scale plate directly show the plus and minus variations from the desired clearance between the male and the female members being gauged at the same time.

Assume that the spindle 10 engages a female work-piece or cylinder and a plunger or piston is applied to the gauging member 11. The piston and the cylinder are intended for interfitting relation and it is desired to know if the amount of clearance these parts will have with one another is too much or too little. The leakage present at the gauging orifice 13 determines the level of the float 14, and the leakage at the gauging orifice at the side of the groove 12 determines the height of the float 21. Assume that the male and female pieces being gauged are the standards or masters, and are of exact known size with the proper amount of clearance. This clearance may perhaps be $1/10,000$ of an inch in case of certain kind of pumps and the amount of permissible tolerance from that desired clearance may be one half that total clearance, plus or minus. With the standard pieces applied, the knob 44 is adjusted until the index 25 is directly opposite the float 14 wherever that float may be. The thumb screw 35 is loosened and the index or scale plate 36 is then moved along the cable until its zero line is directly opposite the top of the float 21 wherever that float may be. This adjusts the gauge for the masters, and the workpieces to be gauged are then applied to the gauging members.

Suppose that the float 14 takes some new position when the workpieces are applied. The knob 44 is then turned until the index arm 25 is directly opposite this new position of the float. That automatically adjusts the scale plate 36 so that its zero mark should be opposite the float 21 if there is the exact desired clearance between the male and female members being gauged as existed in the masters. However, if this clearance is a little more or little less, that will be directly shown by the position of the float 21 with respect to the scale markings on the index plate 36. If the clearance is a little bit more than the exact $1/10,000$ of an inch desired, the top of the float 21 would be a little above the zero mark and the amount of this increase of clearance is directly shown by the graduations on the index or scale plate 36. The exact size of the male or of the female member need not be known, but the exact clearance that would exist between the parts is gauged directly in accordance with the present invention. Parts can therefore be selected to best cooperate with one another.

It will be obvious that if the male part being gauged is slightly smaller than the standard, the increased air flow through the tube 20 causes the float 21 to assume a somewhat higher position than with the standard. If the female part being gauged at the same time is also a little smaller than standard there would be less flow through the tube 15, so that as one float lowers the other float should correspondingly rise, if the clearance between the workpieces is the desired amount. Where the only reading desired is the amount of clearance between the male and female parts being gauged at the same time, it is unnecessary to provide a scale along the side of the tube 15, but if the exact size of the female member is to be determined, a scale plate 50, provided with graduations, is arranged along the tube 15 so that the size of the female part will be shown by the scale readings in comparison to the readings on the scale when the female standard is used. The scale plate 50 may also extend around back of the tube 20 and have graduations that may be used in conjunction with that tube if desired. The graduations on this scale plate need not be considered, however, in merely gauging the clearance between two parts intended to interfit with one another.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device comprising a pair of upright flow tubes of tapering internal cross sectional area, a support on which said tubes are arranged with their smaller ends lowermost, a work engaging member connected to one of said tubes and having a fluid discharge gauging nozzle adapted for cooperation with the interior surface of a workpiece, a work engaging member connected to the other of said tubes and having a fluid discharge gauging nozzle adapted for cooperation with the exterior surface of a second workpiece intended to interfit with the first workpiece, said tubes each having a float operable therein in response to the rate of flow of fluid through the respective gauging nozzles, an adjustable index member for each of said tubes adjustably mounted for movement along the length of their respective tubes, and means interconnecting said index members to cause equal but opposite movement of said members.

2. A gauging device comprising a pair of upright flow tubes of tapering internal cross sectional area, a support on which said tubes are arranged with their smaller ends lowermost, a work engaging member connected to one of said tubes and having a fluid discharge gauging nozzle adapted for cooperation with the interior surface of a workpiece, a work engaging member connected to the other of said tubes and having a fluid discharge gauging nozzle adapted for cooperation with the exterior surface of a second workpiece intended to interfit with the first workpiece, said tubes each having a float operable therein in response to the rate of flow of fluid through the respective gauging nozzles, an index member for each of said tubes, means for adjustably supporting said index members for movement along the length of their respective tubes, means interconnecting said index members to cause equal but opposite movement of said members, and means operable to adjust said members.

3. A gauging device comprising a pair of upright flow tubes of tapering internal cross sectional area, a support on which said tubes are arranged with their smaller ends lowermost, a work engaging member connected to one of said tubes and having a fluid discharge gauging nozzle adapted for cooperation with the interior surface of a workpiece, a work engaging member connected to the other of said tubes and having a fluid discharge gauging nozzle adapted for cooperation with the exterior surface of a second workpiece intended to interfit with the first workpiece, said tubes each having a float operable therein in response to the rate of flow of fluid through the respective gauging nozzles, an adjustable index member for each of said tubes, one of said index members having a scale showing plus and minus variations from a normal clearance between the two workpieces, and means inter-connecting said indexes for simultaneous but opposite movement.

4. A gauging device comprising a pair of upright flow tubes of tapering internal cross sectional area, a support on which said tubes are arranged with their smaller ends lowermost, a work engaging member connected to one of said tubes and having a fluid discharge gauging nozzle adapted for cooperation with the interior surface of a workpiece, a work engaging member connected to the other of said tubes and having a fluid discharge gauging nozzle adapted for cooperation with the exterior surface of a second workpiece intended to interfit with the first workpiece, said tubes each having a float operable therein in response to the rate of flow of fluid through the respective gauging nozzles, an index member for each of said tubes adjustably mounted for movement along the length of their respective tubes, an interconnection for said index members to cause relatively opposite movement of said members, means for operating said interconnection to move said index members and means for relatively adjusting the position of said index members with respect to said interconnection.

5. A gauging device comprising a pair of upright flow tubes of tapering internal cross sectional area, a support on which said tubes are arranged with their smaller ends lowermost, a work engaging member connected to one of said tubes and having a fluid discharge gauging nozzle adapted for cooperation with the interior surface of a workpiece, a work engaging member connected to the other of said tubes and having a fluid discharge gauging nozzle adapted for cooperation with the exterior surface of a second workpiece intended to interfit with the first workpiece, said tubes each having a float operable therein in response to the rate of flow of fluid through the respective gauging nozzle, an adjustable index member for each of said tubes, means for guiding said index members for movement along the lengths of their respective tubes, a flexible cable interconnected to said members, means guiding said cable to cause equal but opposite movement of said members, means for moving said cable to adjust said members, and an index scale on one of said members for directly indicating the clearance between the workpieces.

RICHARD Y. MOSS.